United States Patent
Vankamamidi et al.

(10) Patent No.: US 9,921,912 B1
(45) Date of Patent: Mar. 20, 2018

(54) USING SPARE DISK DRIVES TO OVERPROVISION RAID GROUPS

(71) Applicant: EMC IP Holding Company LLC, Hopkinton, MA (US)

(72) Inventors: Vamsi Vankamamidi, Shrewsbury, MA (US); Ryan Gadsby, Westwood, MA (US); Thomas E. Linnell, Northborough, MA (US); David W. Harvey, Newton, MA (US); Daniel Cummins, Hudson, NH (US); Steven Morley, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 31 days.

(21) Appl. No.: 14/870,187

(22) Filed: Sep. 30, 2015

(51) Int. Cl.
    *G06F 11/00* (2006.01)
    *G06F 11/10* (2006.01)
    *G06F 3/06* (2006.01)

(52) U.S. Cl.
    CPC ........ *G06F 11/1092* (2013.01); *G06F 3/0619* (2013.01); *G06F 3/0631* (2013.01); *G06F 3/0659* (2013.01); *G06F 3/0688* (2013.01)

(58) Field of Classification Search
    CPC .................................................. G06F 11/1092
    USPC ............ 714/6.22, 6.21, 6.23, 6.24, 6.13, 6.1
    See application file for complete search history.

(56) References Cited

U.S. PATENT DOCUMENTS

| 7,809,884 | B1 | 10/2010 | Linnell | |
|---|---|---|---|---|
| 9,354,975 | B2 | 5/2016 | Aliev et al. | |
| 9,507,535 | B2 | 11/2016 | Aliev et al. | |
| 2007/0088990 | A1* | 4/2007 | Schmitz | G11B 20/20 714/700 |
| 2014/0325262 | A1* | 10/2014 | Cooper | G06F 11/1092 714/6.22 |
| 2016/0239397 | A1* | 8/2016 | Thomas | G06F 11/2094 |

OTHER PUBLICATIONS

Edward S. Robins, et al.; "Spare Selection in a Declustered RAID System", U.S. Appl. No. 14/729,714, filed Jun. 3, 2015.

* cited by examiner

*Primary Examiner* — Dieu Minh T Le
(74) *Attorney, Agent, or Firm* — BainwoodHuang (57) ABSTRACT

A technique for managing spare disk drives in a data storage system includes transferring segments of data from disk drives of an operating RAID group to spare regions on a set of spare disk drives to create unused space in the disk drives of the RAID group, thus using the spare regions to overprovision storage in the RAID group. Upon a failure of one of the disk drives in the RAID group, data of the failing disk drive are rebuilt based on the segments of data as well as on data from still-functioning disk drives in the RAID group. Thus, the spare disk drives act not only to overprovision storage for the RAID group prior to disk drive failure, but also to fulfill their role as spares in the event of a disk drive failure.

15 Claims, 6 Drawing Sheets

USING SPARE DISK DRIVES TO OVERPROVISION RAID GROUPS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems often provide non-volatile storage in the form of RAID groups. RAID is an acronym for Redundant Array of Independent (or Inexpensive) Disks. RAID groups providing redundant storage may employ mirroring of data across multiple disk drives (e.g., RAID 1) and/or may employ parity (e.g. RAID 3, 4, 5, or 6). As is known, parity provides a way to reconstruct data from any failed disk drive by performing computations on data from still-functioning disk drives in a RAID group.

Many data storage systems include spare disk drives in the event that any disk drive in a RAID group fails. When a disk drive failure occurs, a data storage system may logically swap a spare drive in place of the failing drive and use RAID relationships to rebuild data that was previously stored on the failed drive onto the spare. Such spare disk drives may be plugged into the data storage system and kept in a powered state, such that they may be logically swapped in to replace failed disk drives without undue delay.

SUMMARY

Unfortunately, data storage systems do not generally make efficient use of spare disk drives. Although spare disk drives are fully-functional drives, which are designed to provide performance at the same level as the disk drives they are intended to replace, spare drives do nothing more in conventional data storage systems than occupy space, consume power, and generate heat.

In contrast with prior disk sparing schemes, an improved technique for managing spare disk drives in a data storage system includes transferring segments of data from disk drives of an operating RAID group to spare regions in a set of spare disk drives to create unused space in the disk drives of the RAID group, thus using the spare regions to over-provision storage in the RAID group. Upon failure of one of the disk drives in the RAID group, data from the failing disk drive are rebuilt based on the segments of data as well as on data from still-functioning disk drives in the RAID group. Thus, the spare disk drives act not only to overprovision storage for the RAID group prior to a disk drive failure, but also to fulfill their role as spares in the event of a disk drive failure.

Advantageously, overprovisioning storage has the effect of distributing some of the workload of the RAID group into the spare regions, thus reducing the workload per disk drive or, alternatively, allowing the workload to be increased overall. Where the RAID group is implemented using SSDs (solid state drives), overprovisioning of storage provides the additional benefit of reducing write amplification within the SSDs of the RAID group and therefore extending the life expectancy of the SSDs.

Certain embodiments are directed to a method of managing spare disk drives in a data storage system. The method includes operating multiple RAID groups in the data storage system, each RAID group including multiple disk drives arranged to provide at least one of data mirroring and data parity. For each of the RAID groups, the method includes copying segments of data from a set of regions of the disk drives in that RAID group to respective spare regions in a set of spare disk drives, the set of regions in the disk drives in that RAID group becoming unused regions and the spare regions in the set of spare disk drives effecting an overprovisioning of storage for that RAID group. Upon a failure of one of the disk drives in one of the RAID groups, the method further includes rebuilding data of the failed disk drive based on (i) the segments of data for that RAID group and (ii) data from a set of still-functioning disk drives in that RAID group.

Other embodiments are directed to a data storage system constructed and arranged to perform a method of managing spare disk drives in a data storage system, such as the method described above. Still other embodiments are directed to a computer program product. The computer program product stores instructions which, when executed by control circuitry of a data storage system, cause the data storage system to perform a method of managing spare disk drives in a data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing spare disk drives in a data storage system includes transferring segments of data from disk drives of an operating RAID group to spare regions on a set of spare disk drives to create unused space in the disk drives of the RAID group, thus employing the spare regions to overprovision storage in the RAID group. In the event of a disk drive failure, the RAID group is rebuilt using the segments of data as well as data from still-functioning disk drives in the RAID Group.

Figure 1:
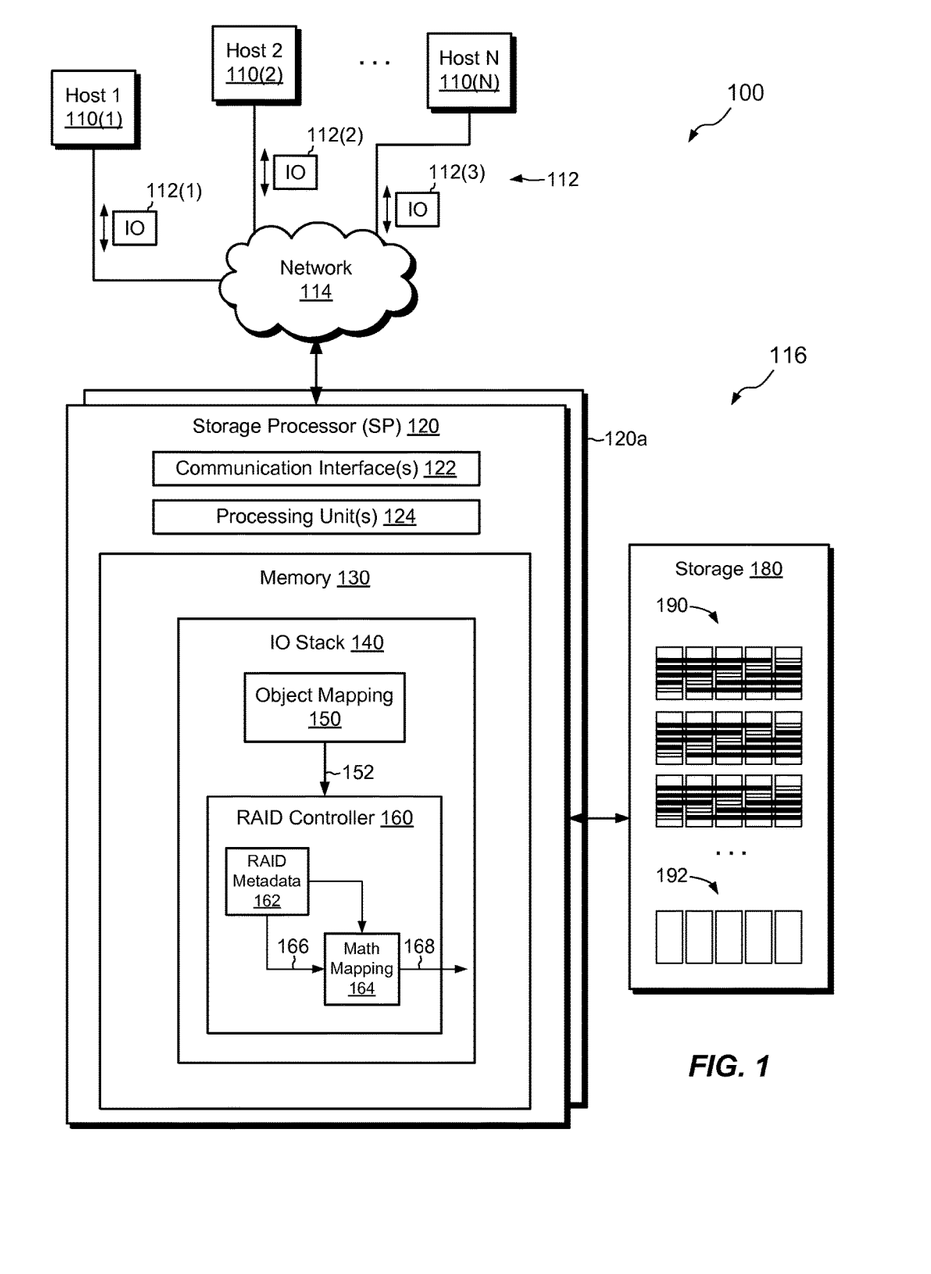
FIG. 1 is a block diagram of an example environment in which embodiments of the invention hereof can be practiced.

FIG. 1 shows an example environment 100 in which embodiments of the improved technique hereof can be practiced. Here, host computing devices ("hosts"), shown as devices 110(1) through 110(N), access a data storage system 116 over a network 114. The data storage system 116 includes a storage processor, or "SP," 120 and storage 180. The SP 120 may be any type of computing device capable of processing host IOs. The storage 180 includes, for example, magnetic disk drives, solid state drives, and/or optical drives and the like, which are arranged in RAID groups 190. Disk drives that make up a given RAID group 190 are generally of the same type and provide similar levels of performance. The storage 180 also includes spare disk drives 192. Although three RAID groups 190 and five spare disk drives 192 are shown, it should be understood that the storage 180 may include any non-zero number of RAID groups 190 and any non-zero number of spare disk drives 192. Certain embodiments may require additional numbers of RAID groups 190 and/or spare disk drives 192, however. Although each of the RAID groups 190 is seen to include five disk drives, this is merely an example, as RAID groups 190 may each include any number of disk drives and may be arranged in any RAID configuration that provides mirroring and/or parity. Suitable RAID configurations may include RAID 1, RAID 4, RAID 5, and RAID 6, for example. However, embodiments of the invention hereof are not limited to any particular RAID configurations. Also, the terms "disk drive," "disk," and "drive" as used herein are intended to apply to storage drives of any type or technology, and thus includes magnetic disk drives, optical disk drives, SSDs, flash drives, and the like, even if such drives have no identifiable "disk."

The SP 120 is seen to include one or more communication interfaces 122, a set of processing units 124, and memory 130. The communication interfaces 122 include, for example, SCSI target adapters and network interface adapters, for converting electronic and/or optical signals received over the network 114 to electronic form for use by the SP 120. The set of processing units 124 includes one or more processing chips and/or assemblies. In a particular example, the set of processing units 124 includes numerous multi-core CPUs and associated co-processors and chipsets. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations defined by the software constructs. Although certain software constructs are specifically shown and described, it is understood that the memory 130 typically includes many other software constructs, which are not shown, such as an operating system, various applications, processes, and daemons.

The memory 130 is seen to include (i.e., to realize by execution of software instructions) an IO stack 140. The IO stack 140 provides an execution path for host IOs (e.g., IO requests 112). As shown, the IO stack 140 includes object mapping 150 and RAID controller 160. The object mapping 150 maps IO requests 112 arriving from hosts 110(1) to 110(N) to corresponding RAID instructions 152 for reading and/or writing RAID groups 190, and the RAID controller 160 maps the RAID instructions 152 to disk-level instructions 168 for reading and/or writing corresponding address ranges within individual disk drives. The RAID controller 160 is seen to include RAID metadata 162, as well as mathematical mapping 164. The RAID metadata 162 defines RAID relationships among disk drives in the storage 180 to establish and maintain the RAID groups 190. These relationships include, for example, rules and settings for mapping logical addresses specified in RAID instructions 152 to disk drive addresses 166. In an example, RAID metadata 162 are stored persistently but may be read into main memory for faster access. Mathematical mapping 164 provides rules for adjusting the disk drive addresses 166 to account for movement of data segments between disk drives within RAID groups 190 and spare disk drives 192. Thus, for example, mathematical mapping 164 selectively redirects disk drive addresses 166 of disk drives in RAID groups 190 to addresses within spare disk drives 192. With RAID metadata 162 loaded into memory, mathematical mapping 164 may operate using computations and without having to perform lookups of specific mapping relationships.

In example operation, one or more of the RAID groups 190 operates within the storage 180 to store host-accessible data objects served by the data storage system 116, such as LUNs, file systems, VVols, and so forth. Hosts 110(1) to 110(N) issue IO requests 112 directed to the host-accessible data objects. The SP 120 receives the IO requests 112 at the communication interfaces 122 and forwards them to the IO stack 140 for further processing. The object mapping 150 maps the IO requests 112 to RAID instructions 152 directed to particular RAID groups 190, and the RAID controller 160 maps the RAID instructions 152 to disk operations (e.g., reads and/or writes) of particular address ranges of particular disk drives within the RAID groups 190 and/or spare disk drives 192.

In accordance with particular improvements hereof, one or more of the RAID groups 190, whose disk drives may operate close to their full storage capacity, employs spare regions on one or more spare disk drives 192. For example, the RAID controller 160 moves segments of data from regions in the disk drives of a RAID group to spare regions in spare disk drives 192, thereby creating unused regions within the disk drives of the RAID group. Such redistribution of data into the spare regions results in an overprovisioning of storage space in the RAID group. Thus, instead of operating near-full storage capacity, the disk drives of the RAID group may operate at lesser levels of storage capacity. Consequently, average per-disk utilization, as measured in IOs per second (IOPS) decreases. Also, if the RAID group is composed of SSDs, the overprovisioning afforded by the spare disk regions has the effect of reducing storage utilization and therefore write amplification, thereby extending the expected lifespan of the SSDs. The spare disk drives 192 thus perform an active and useful role in improving operation of the data storage system 116, even when they are not called upon to function specifically as spares.

In the event that disk drives in the RAID groups 190 fail, however, the spare disk drives 192 still fulfill their designated role as spares. For example, upon a disk drive failure in a RAID group, the RAID controller 160 may proceed to rebuild the data of the failed disk drive into available space within that RAID group and/or within the spare segments used for overprovisioning the RAID group, and/or within other spare segments. The resulting rebuilt RAID group then includes the disk drives that did not fail plus the spare segments on the spare disk drives 192. In some examples, the spare segments for the RAID group are found entirely within a single spare disk drive. Thus, for example, if a RAID group starts with five disk drives, is overprovisioned with one spare disk drive, and a disk drive in the RAID group fails, then the RAID group can be rebuilt to its original level of data redundancy with the same number of disk drives that it originally contained. Therefore, the spare disk drive that was added to the RAID group fully performs its role as a spare in the event of a disk drive failure.

Although the RAID group in the above example is rebuilt to its original level of data redundancy following the disk drive failure, the RAID group no longer benefits from the overprovisioning originally afforded by the spare segments. This condition can be rectified, however, by transferring some data segments from the disk drives of the rebuilt RAID group to new spare segments, such as to spare segments on another spare disk drive 192.

In circumstances in which a RAID group is implemented with SSDs, embodiments hereof can benefit from additional advantages by intelligently managing unused segments. For example, the RAID controller 160 can mark unused regions of SSDs as invalid, e.g., when moving segments of data from SSDs in the RAID group into spare segments or when moving data from spare SSDs back again. For example, the RAID controller 160 may issue a TRIM command, for ATA (Advanced Technology Attachment) disk drives, or a UNMAP command for SCSI (Small Computer System Interface) disk drives, which has the effect of marking identified regions of the SSDs as invalid. Marking these regions as invalid enables internal SSD management operations to perform fewer erase/program cycles overall and thus to reduce write amplification, thereby tending to increase the life expectancy of the SSDs.

Figure 2:
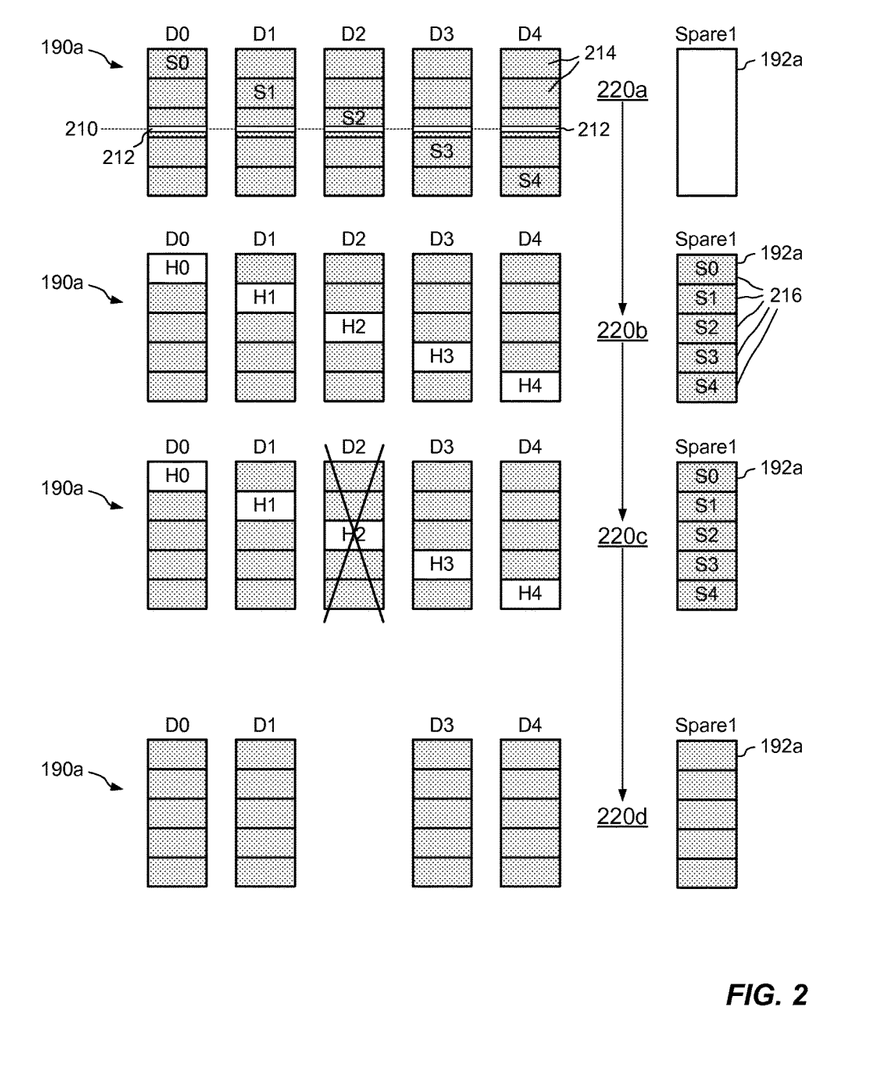
FIG. 2 is a block diagram showing an example sequence of activities involving the use of a RAID group and spare disk drives.

FIG. 2 shows an example arrangement for managing disk drives in a RAID group 190a over a sequence of states 220a to 220d. In the example shown in FIG. 2, RAID group 190a is seen to include five disk drives, D0 to D4, which may be arranged, for example, according to RAID 4 (single parity, fixed), RAID 5 (single parity, distributed), or RAID 6 (double parity). It should be understood, however, that the RAID group 190a may be arranged in any RAID scheme that provides mirroring and/or parity.

In some examples, the RAID group 190a organizes its data storage in stripes 210. A single stripe 210 is shown, which extends across all disk drives D0 to D4. The stripe 210 includes strips 212, with a different strip 212 provided on each of the disk drives D0 to D4. The strips 212 together make up the stripe 210. Typically, the strips 212 are provided at corresponding locations across the disk drives D0 to D4, such that accessing the same address range on all five disk drives accesses all of the strips 212 in the stripe 210. In some examples, one or more of the strips 212 may be designated for parity, while the others may be designated for data. Many parity schemes are possible. A simple scheme for parity computes the value of a parity strip as the bitwise exclusive-OR (XOR) of the data of the corresponding non-parity strips. This arrangement allows any strip 212 in a stripe 210 to be recovered after failure by computing the XOR of the other strips 212 in that stripe 210. In the same manner, the data of any failed disk drive in a RAID group employing parity may be recovered by computing the value of its strips 212 from the values of the other strips 212 in the corresponding stripes 210. Strip sizes may vary, with common, non-limiting examples being 8 KB, 16 KB, 32 KB, or 64 KB, for example. One can obtain the stripe size by multiplying the strip size by the number of disk drives in the RAID group. Although a single stripe 210 is shown, the RAID group 190a may include a large number of stripes 210. Indeed, in typical arrangements, all of the data stored in the disk drives D0 to D4 are provided in stripes 210.

As further shown in FIG. 2, each of the disk drives D0 to D4 may be regarded as including multiple regions 214. Five regions 214 per disk drive are shown. As will become apparent, the regions 214 provide ranges of data that may be moved to spare disk drives 192 for overprovisioning RAID group 190a. The regions 214 are logical structures that extend over address ranges within the disk drives D0 to D4, with correspondingly located regions 214 on different disk drives covering the same address ranges. Thus, for example, a first (top-most) region 214 on disk drive D0 covers the same address range as does the first region 214 on each of the other disk drives D1 to D4. Likewise, the second region 214 on disk drive D0 covers the same address range as does the second region 214 on each of disk drives D1 to D4, and so on. In this manner, regions 214 may be laid out similarly to strips 212, except that regions 214 are typically much larger than strips 212. For example, each region 214 may be on the order of 1 GB, although no particular size is required. Preferably, each region 214 includes an integer number of strips 212, and corresponding regions 214 across the disk drives D0 to D4 include an integer number of stripes 210, although this is not a strict requirement. Also, although five regions 214 are shown per disk drive, this is merely an example, as greater than five regions 214 per disk drive may be provided. For reasons that will become evident, the number of regions 214 per disk drive is preferably an integer multiple of the number of disk drives in the RAID group 190a. Thus, in this example showing five disk drives in RAID group 190a, the number of regions 214 per disk drive is an integer multiple of five. Each of the regions 214 within the disk drives D0 to D4 may store a segment of data. Five such segments, S0 to S4, are labeled, and such regions are presented in a staggered arrangement.

As seen at the top of FIG. 2, state 220a represents a starting condition, in which RAID group 190a may perform operations in the data storage system 116. For example, the RAID group 190a may store data of one or more host-accessible data objects served by the data storage system 116 and may respond to IO requests 112 by reading and/or writing data.

In this state 220a, the disk drives D0 to D4 may have approached their limits of storage capacity and IOPS. Also, if the RAID group 220a is implemented with SSDs, the life expectancy of the SSDs may be compromised, as write amplification will generally be greater than it would be if the SSDs had more free space. Although the RAID group 190a in state 220a may operate at near its full capacity, spare disk drive 190a (Spare 1) may be idle.

As seen in state 220b, some of the burden on the RAID group 190a has been shifted to the spare disk drive 192a. Segments of data S0 to S4 have been copied from the respective disk drives D0 to D4 to respective spare regions 216 of spare disk drive 192a. The copying of segments S0 to S4 leaves unused regions, or "holes," H0 to H4, at locations previously occupied by S0 to S4. For SSD implementations, the RAID controller 160 may issue TRIM or UNMAP commands to the regions H0 to H4, to identify those regions as invalid. For magnetic disk drive implementations, the RAID controller 160 may delete the data in H0 to H4, or (more typically) simply mark the data as invalid.

In an example, RAID controller 160 adjusts RAID metadata 162 to reflect the movement of segments S0 to S4 from disks D0 to D4 to spare disk drive 192a. For example, RAID metadata 162 describing a disk location of spare disk 192a is input to mathematical mapping 164. Mathematical mapping 164 remaps any instructions to access (e.g., read or write) segments S0 to S4 on disks D0 to D4 to the respective locations on spare disk drive 192a. In an example, such remapping is mathematical in nature (e.g., adding or subtracting an offset) and does not require access to any mapping table, nor does it require any other type of address look-up.

It is seen that state 220b represents an overprovisioned state of the RAID group 190a. In the example shown, fully 20% of the disk space on each of the disk drives D0 to D4 has been freed. Accordingly, the amount of data stored by each of the disk drives D0 to D4 has been reduced by up to 20%. This reduction in storage on each disk drive is expected to extend the lifespan of the disk drive, particularly if that disk drive is an SSD.

In the example shown, where segments S0 to S4 are copied to a single spare disk drive 192a, the basis for the staggered arrangement of S0 to S4 in state 220a becomes evident. If two segments were allowed to occupy the same position across multiple disk drives, moving the segments to the single spare disk drive 192a would have the effect of undermining RAID protection, as multiple strips 212 for a given stripe 210 would reside on the same spare disk drive 192a. Failure of the spare disk drive 192a might then result in data loss. Thus, for arrangements in which segments from a RAID group are moved to a single spare drive, care should be taken to avoid moving segments from corresponding locations among the disk drives. Conversely, if it is desirable or necessary to move multiple segments from corresponding region locations, such segments may be moved to spare segments 216 on different spare disk drives.

Continuing now to state 220c, it is seen that a disk drive (disk D2) in RAID group 190a has failed. As mirroring and/or parity of the RAID group 190a has provided data redundancy, RAID controller 160 can continue to access data in the RAID group 190a. However, redundancy has been compromised, such that loss of another disk drive might result in data loss. Thus, the RAID controller 160 preferably moves quickly to repair the RAID group 190a to restore the original level of redundancy.

As shown in state 220d, data from the failed disk drive D2 has been rebuilt and stored in available space within the RAID group 190a and spare 192a. Because one region of data on D2, i.e., S2, was previously moved the spare 192a, it is necessary to rebuild only four regions of D2, i.e., from the first, second, fourth, and fifth positions. As there are four unused regions currently available, i.e., holes H0, H1, H3, and H4, just enough space is left on the remaining disk drives D0, D1, D3, D4, and the spare 192a to house the rebuilt data. The data may be arranged among the five remaining disk drives in any suitable way, with mapping within the RAID controller 160 adjusted accordingly. Once the data of disk D2 has been rebuilt, the RAID group 190a and spare drive 192a together have restored the original level of redundancy, and the disk drives return to a state similar to that shown in initial state 220a. From here, a new spare disk may be added, segments may be copied to the new spare, and operation may proceed in a manner similar to that shown in state 220b.

Figure 3:
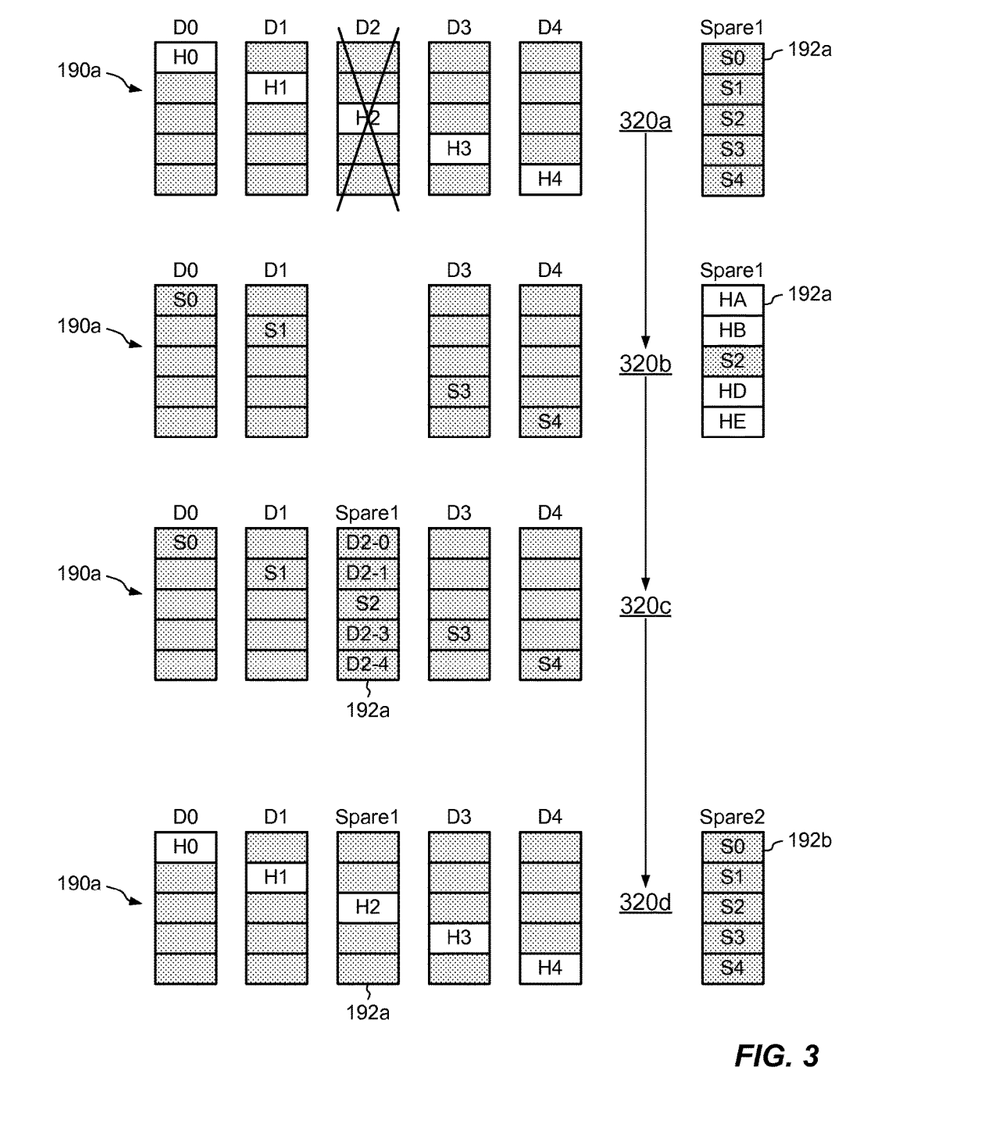
FIG. 3 is a block diagram showing another example sequence of activities involving the use of a RAID group and spare disk drives.

FIG. 3 shows a more particular example of the arrangement of FIG. 2. Here, it is seen that state 320a is the same as state 220c (FIG. 2), i.e., the state at which disk drive D2 fails. In an example, states preceding state 320a may be the same as those described previously in connection with states 220a and 220b.

At state 320b, it is seen that segments of data S0, S1, S3, and S4 have been copied from spare disk 192a back to their original positions in D0, D1, D3, and D4. Segment S2 may remain on the spare disk drive 192a. Moving the segments creates unused regions (holes) HA, HB, HD, and HE. For SSD implementations, these regions may be subjected to TRIM/UNMAP commands, as described previously. Also, RAID controller 160 may perform remapping, as described previously, effectively restoring the original mappings for S0, S1, S3, and S4 to their previous positions.

Continuing to state 320c, it is seen that the data from failed disk drive D2 are rebuilt onto the spare disk drive 192a. Thus, data D2-0, D2-1, D2-3, and D2-4 from region positions 0, 1, 3, and 4, respectively, of D2 provide repair data, which repair data are stored in the corresponding regions of spare disk 192a. At this point, spare disk drive 192a may assume a position similar to that previously held by disk D2, i.e., the spare disk drive 192a operates as a direct replacement for failed disk drive D2.

Although redundancy has been restored, the RAID group 190a no longer benefits from overprovisioning. This condition may be rectified, however, in state 320d, by moving segments S0 to S4 to a new spare disk drive 120b to create holes H0 to H4, respectively.

Figure 4:
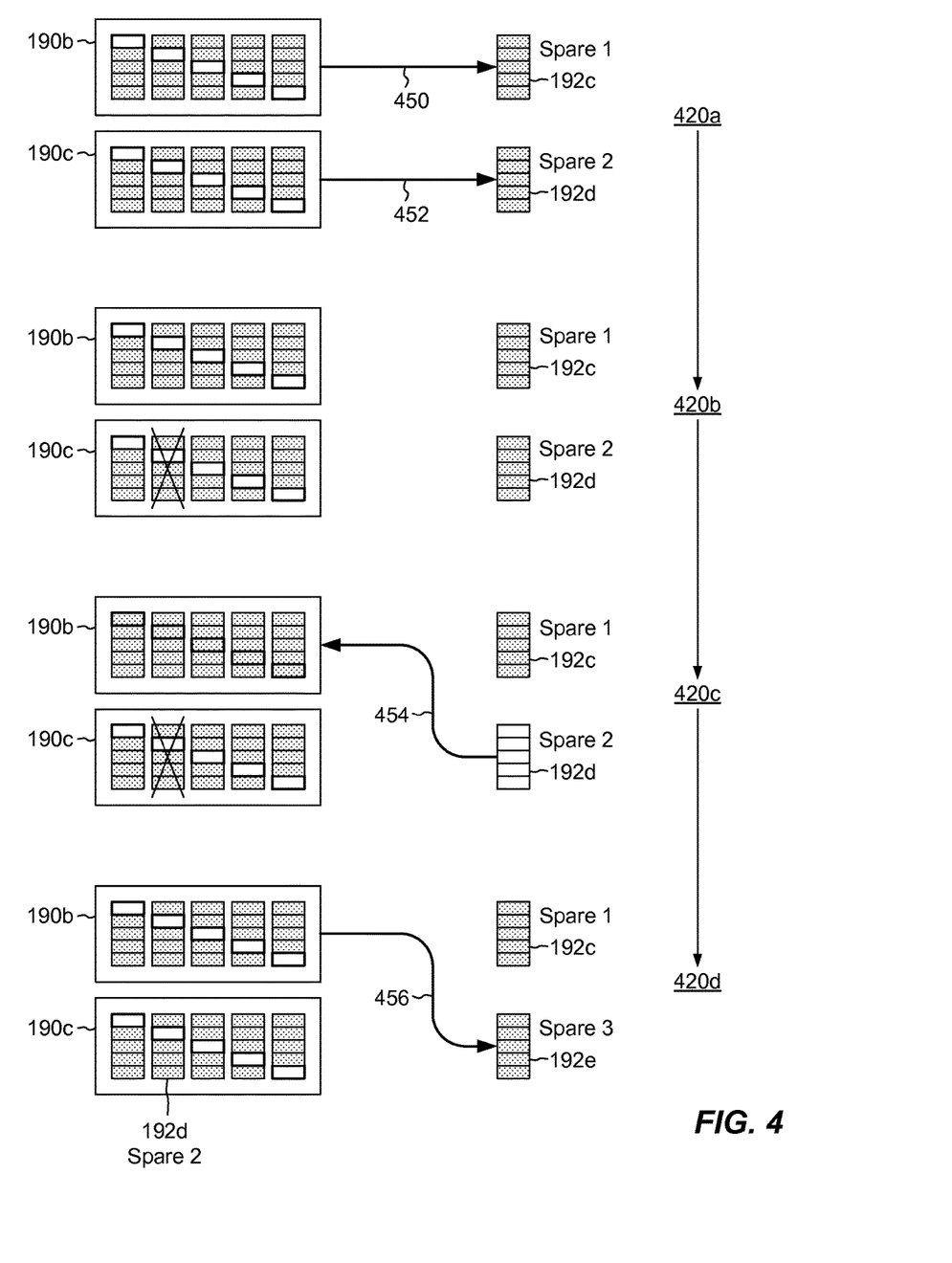
FIG. 4 is a block diagram showing a variant of the example shown in FIG. 3.

FIG. 4 shows a variant of the example shown in FIG. 3, which variant uses spare disk drives in different ways from those described above. Here, at state 420a, two RAID groups 190b and 190c are shown. Segments have been moved (arrow 450) from disk drives in RAID group 190b to spare disk drive 192c (spare 1), creating holes in RAID group 190b. Also, segments have been moved (arrow 452) from disk drives in RAID group 190c to spare disk drive 192d (spare 2), creating holes in RAID group 190c. The status of the RAID groups 190b and 190c in state 420a is thus similar to the status of RAID group 190a in state 220b of FIG. 2.

At state 420b, one of the disk drives in RAID group 190c fails. Repair operations promptly ensue.

At state 420c, spare disk drive 192d, which received segments from the RAID group 190c, moves the segments (arrow 454) to holes previously created in RAID group 190b. Thus, the segments on spare disk drive 192d are moved to holes in a different RAID group from the one from which they were obtained. In general, the segments can be moved to any hole on any disk drive in any of the RAID groups 190 (FIG. 1), as long as the RAID controller 160 keeps track of their locations, preferably mathematically, i.e., without requiring address look-ups. Moving the segments creates holes in spare disk drive 192d (which may be subject to TRIM/UNMAP commands in SSD implementations). Repair data for the failed disk drive is then rebuilt directly onto spare disk drive 192d. As the failed disk drive contained a hole at one of the region positions, it is necessary only to generate repair data for the other positions.

State 420d shows the rebuilt condition, showing spare disk drive 192d inserted in place of the failed disk drive in RAID group 190c. Preferably, the segments of data moved from spare disk drive 192d to holes in RAID group 190b are moved (arrow 456) to a new spare disk drive 192e (spare 3), with remapping performed accordingly. At the conclusion of these activities, RAID group 190b benefits from overprovisioning afforded by spare disk drive 192c, while RAID group 190c benefits from overprovisioning afforded by spare disk drive 192e.

FIG. 4 thus shows one of many possible ways in which unused regions may be employed to assist with management of spare disk drives. In some examples, RAID groups 190 and spare disk drives 192 may be managed at the level of regions 214 to flexibly employ unused regions wherever they may be found among disk drives in the RAID groups 190 and spare disks 192. In an example, the RAID controller 160 dynamically selects unused regions to which to move segments of data based on, for example, disk drive activity. For instance, the RAID controller 190 may preferentially move segments to unused regions on disk drives that are experiencing low traffic or that are otherwise underutilized.

Figure 5:
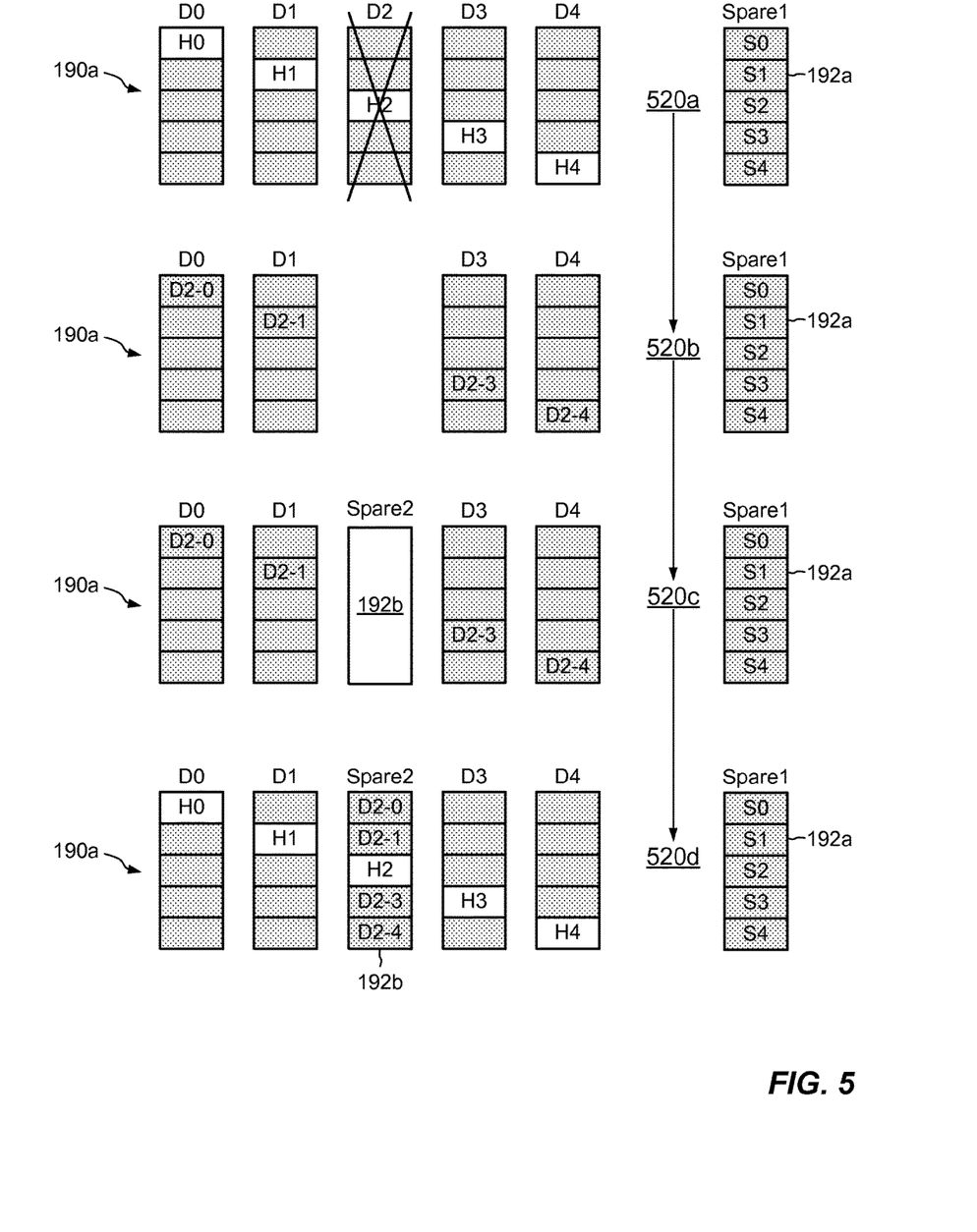
FIG. 5 is a block diagram showing yet another example sequence of activities involving the use of a RAID group and spare disk drives.

FIG. 5 shows another particular example of the arrangement shown in FIG. 2. The arrangement of FIG. 5 is similar to that of FIG. 3 but promotes faster rebuilding of repair data following a disk drive failure. Here, state 520a is the same as state 220c (FIG. 2), i.e., the state at which disk drive D2 failed. In an example, the states preceding state 520a may be the same as those described previously in connection with states 220a and 220b.

At state 520b, the RAID controller 160 has generated repair data D2-0, D2-1, D2-3, and D2-4 and has thus reconstructed the data from the failed disk drive D2. As D2-2 corresponds to an unused region, no repair data is needed for D2-2. Here, the repair data D2-0, D2-1, D2-3, and D2-4 have been stored in the locations of holes H0, H1, H3, and H4, respectively. The RAID controller 160 updates the mapping metadata 162 accordingly. Significantly, no disk copy operation is required prior to rebuilding the RAID group 190a. Rather, the RAID controller 160 may start rebuilding the RAID group 190a immediately into the hole locations upon detecting the failed disk drive. This arrangement therefore reduces delays in restoring the RAID group 190b to its original level of redundancy and thus reduces the risk of data loss in the event that a second disk drive in the RAID group 190a should fail soon after the first.

Although the spare disk drive 192a allows the RAID group 190a to restore its original level of redundancy, thus fulfilling its role as a spare, the resulting arrangement does not benefit from the advantages of overprovisioning described above. This condition can be rectified, however, by adding another spare disk drive 192b (spare 2) in place of the failed disk drive (at state 520c) and by transferring the repair data D2-0, D2-1, D2-3, and D2-4 to the respective locations of the spare disk drive 192b (at state 520d), thereby creating holes H0 to H4. The resulting arrangement resembles that prior to the failure of D2 and restores the RAID group to its overprovisioned, fully rebuilt state.

Figure 6:
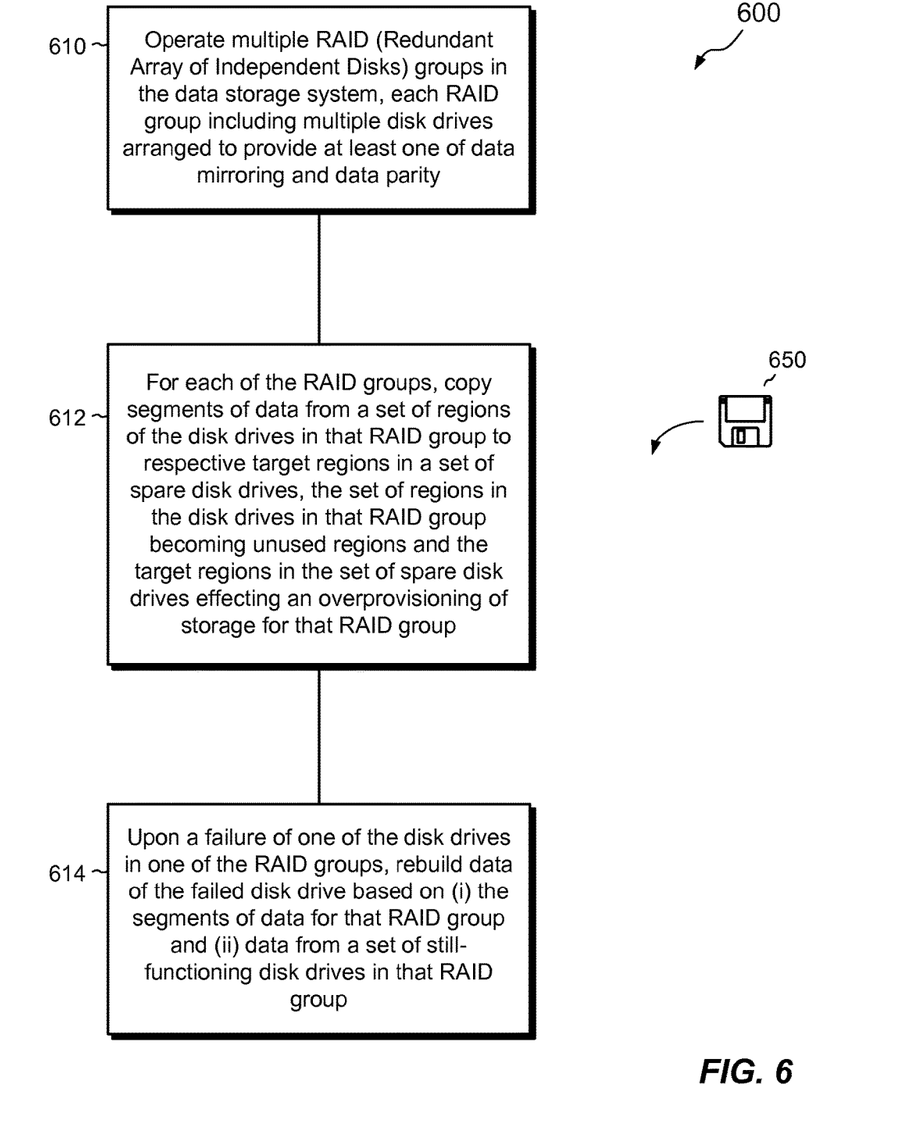
FIG. 6 is a flowchart showing an example method of managing spare disk drives in at data storage system.

FIG. 6 shows an example process 600 for managing spare disk drives in a data storage system. The process 600 may be carried out, for example, by the software constructs, described in connection with FIG. 1, which reside in the memory 130 of the storage processor 120 and are run by the set of processors 124. The various acts of the process 600 may be ordered in any suitable way. Accordingly, embodiments may be constructed in which acts are performed in orders different from those illustrated, which may include performing some acts simultaneously, even though the acts are shown as sequential in the illustrated embodiments.

At 610, multiple RAID groups are operated in the data storage system. Each RAID group includes multiple disk drives arranged to provide at least one of data mirroring and data parity. For example, the data storage system 116 (FIG. 1) operates multiple RAID groups 190, with each RAID group arranged for mirroring (e.g., RAID 1) and/or parity (e.g., RAID 4, 5, or 6). The RAID groups 190 may store host-accessible data objects, which can be read and/or written to in response to hosts 110(1) to 110(N) issuing IO requests 112.

At 612, for each of the RAID groups, segments of data are copied from a set of regions of the disk drives in that RAID group to respective spare regions in a set of spare disk drives, the set of regions in the disk drives in that RAID group becoming unused regions and the spare regions in the set of spare disk drives effecting an overprovisioning of storage for that RAID group. For example, as shown in FIG. 2, segments of data S0 to S4 are copied from regions 214 of disk drives D0 to D4 in RAID group 190a to spare regions 216 on spare disk drive 192a. The regions 214 on the disk drives D0 to D4 become unused regions (holes), H0 to H4. The use of spare regions 216 effects an overprovisioning of storage in the RAID group 190a by allowing regions of the disk drives D0 to D4 to remain empty.

At 614, upon a failure of one of the disk drives in one of the RAID groups, data of the failed disk drive are rebuilt based on (i) the segments of data for that RAID group and (ii) data from a set of still-functioning disk drives in that RAID group. For example, as shown in FIGS. 3 and 5, data from D2, the failed disk drive, are rebuilt onto a spare disk drive (192a for FIGS. 3 and 192b for FIG. 5), based on the segments of data S0-S4 as well as on data D2-0, D2-1, D2-3, and D2-4 calculated from still-functioning disk drives D0, D1, D3, and D4. In some RAID configurations that provide multiple parity or multiple mirrors, it may suffice to read fewer than all still-functioning disk drives to construct the repair data D2-0, D2-1, D2-3, and D2-4.

An improved technique has been described for managing spare disk drives in a data storage system. The technique includes transferring segments of data from disk drives of an operating RAID group to spare regions on a set of spare disk drives to create unused space in the disk drives of the RAID group, thus using the spare regions to overprovision storage in the RAID group. Upon a failure of one of the disk drives in the RAID group, data of the failing disk drive are rebuilt based on the segments of data as well as on data from still-functioning disk drives in the RAID group. Thus, the spare disk drives act not only to overprovision storage for the RAID group prior to disk drive failure, which is especially beneficial for SSDs, but also to fulfill their role as spares in the event of a disk drive failure.

Having described certain embodiments, numerous alternative embodiments or variations can be made. For example, as shown and described, data segments 214 are copied to spare regions 416 that are provided together on a single spare disk drive. However, this is merely an example, as spare regions 416 may be distributed across multiple spare disk drives.

Also, as shown and described, spare segments are seen to provide overprovisioning of disk drives in RAID groups 190 by 20%. However, this is merely an example. For instance, a second spare disk drive could be added to a RAID group to overprovision by 40%. Also, RAID groups having different numbers of disk drives may overprovision by different amounts. The examples shown are intended to be merely illustrative.

Also, as shown and described, disk drives are divided into regions 214, such that the address space of each disk drive is encompassed entirely by regions 214. However, this is also merely an example. Alternatively, all of the regions 214 within a disk drive may occupy less than that disk drive's entire address space.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing spare disk drives in a data storage system, the method comprising:
    operating multiple RAID (Redundant Array of Independent Disks) groups in the data storage system, each RAID group including multiple disk drives arranged to provide at least one of data mirroring and data parity;
    for each of the RAID groups, copying segments of data from a set of regions of the disk drives in that RAID group to respective spare regions in a set of spare disk drives, the set of regions in the disk drives in that RAID group becoming unused regions and the spare regions in the set of spare disk drives effecting an overprovisioning of storage for that RAID group; and
    upon a failure of one of the disk drives in one of the RAID groups, rebuilding data of the failed disk drive based on (i) the segments of data for that RAID group and (ii) data from a set of still-functioning disk drives in that RAID group,
    wherein the multiple RAID groups include a particular RAID group, and wherein the method further comprises marking, by a RAID controller, the unused regions in the particular RAID group as invalid,
    wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
    wherein each segment of data includes an integer number of RAID strips, and wherein no two segments of data on different disk drives of a RAID group include RAID strips belonging to the same RAID stripe,
    wherein, the RAID groups include an instant RAID group, wherein the set of spare disk drives includes an instant spare disk drive, and wherein copying the segments of data from the set of regions of the disk drives of the instant RAID group to respective spare regions includes copying all segments of data for the instant RAID group to the instant spare disk drive, and
    wherein the method further comprises:
        for each of the spare regions in the instant spare disk drive, except any spare regions to which any segments of data were copied from the failing disk drive, copying data from that spare region to a respective unused region in the instant RAID group, the spare regions from which data are copied becoming unused regions in the instant spare disk drive; and
        rebuilding a set of data into the unused regions of the instant spare disk drive, the set of data including data previously stored in the failed disk drive.

2. The method of claim 1, further comprising, after copying segments of data, remapping access requests directed to the set of unused regions to the respective spare regions on the set of spare disk drives, wherein remapping an access request includes transforming an initial disk address to a target disk address by applying a mathematical operation to the initial disk address.

3. The method of claim 1,
    wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
    wherein each segment of data includes an integer number of RAID strips, and wherein no two segments of data on different disk drives of a RAID group include RAID strips belonging to the same RAID stripe, and
    wherein at least one of the RAID groups is an SSD (Solid State Drive) RAID group composed of SSDs, and wherein the method further comprises marking each of the unused regions on each of the SSDs as containing invalid data.

4. The method of claim 1, wherein, after rebuilding the set of data into the unused regions of the instant spare disk drive, the instant spare disk drive becomes part of the instant RAID group, and wherein the method further comprises:

providing a second spare disk drive; and
copying segments of data from a set of regions of the disk drives of the instant RAID group to respective spare regions in the second spare disk drive, the set of regions in the disk drives of the instant RAID group becoming unused regions and the spare regions in the second spare disk drive effecting an overprovisioning of storage for the instant RAID group.

5. The method of claim 1,
wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
wherein each segment of data includes an integer number of RAID strips, and wherein no two segments of data on different disk drives of a RAID group include RAID strips belonging to the same RAID stripe,
wherein, the RAID groups include an instant RAID group, wherein the set of spare disk drives includes an instant spare disk drive, and wherein copying the segments of data from the set of regions of the disk drives of the instant RAID group to respective spare regions includes copying all segments of data for the instant RAID group to the instant spare disk drive, and
wherein the method further comprises:
for each of the spare regions in the instant spare disk drive, copying data from that spare region to a respective unused region on another disk drive in the data storage system, the spare regions from which data are copied becoming unused regions in the instant spare disk drive; and
rebuilding a set of data into the unused regions of the instant spare disk drive, the set of data including data previously stored in the failed disk drive.

6. The method of claim 1,
wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
wherein each segment of data includes an integer number of RAID strips, and wherein no two segments of data on different disk drives of a RAID group include RAID strips belonging to the same RAID stripe,
wherein, the RAID groups include an instant RAID group, wherein the set of spare disk drives includes an instant spare disk drive, and wherein copying the segments of data from the set of regions of the disk drives of the instant RAID group to respective spare regions includes copying all segments of data for the instant RAID group to the instant spare disk drive, and
wherein the method further comprises rebuilding a set of data into the unused regions in the disk drives of the instant RAID group, except for the failing disk drive, the set of data including data previously stored in the failed disk drive.

7. The method of claim 6, further comprising providing a new spare disk drive and copying the set of data to the new spare disk drive, such that the unused regions into which the set of data were rebuilt again become unused.

8. The method of claim 1,
wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
wherein each segment of data includes an integer number of RAID strips, and wherein no two segments of data on different disk drives of a RAID group include RAID strips belonging to the same RAID stripe,
wherein, the RAID groups include an instant RAID group, wherein the set of spare disk drives includes an instant spare disk drive, and wherein copying the segments of data from the set of regions of the disk drives of the instant RAID group to respective spare regions includes copying all segments of data for the instant RAID group to the instant spare disk drive, and
wherein the method further comprises rebuilding a set of data into unused regions in other disk drives in the data storage system, the set of data including data previously stored in the failed disk drive.

9. The method of claim 1, wherein the particular RAID group is composed of SSDs, and wherein marking, by the RAID controller, the unused regions in the particular RAID group as invalid includes issuing, by the RAID controller, one of a TRIM command or an UNMAP command to the unused regions in the particular RAID group.

10. A data storage system, comprising control circuitry that includes a set of processing units coupled to memory, the control circuitry constructed and arranged to:
operate a RAID (Redundant Array of Independent Disks) group in the data storage system, the RAID group including multiple disk drives arranged to provide at least one of data mirroring and data parity;
copy segments of data from a set of regions in the disk drives to respective spare regions in a spare disk drive, the set of regions in the disk drives of the RAID group becoming unused regions and the spare regions in the spare disk drive effecting an overprovisioning of storage for the RAID group; and
upon a failure of one of the disk drives in the RAID group, rebuild data of the failed disk drive based on (i) the segments of data and (ii) data from a set of still-functioning disk drives in the RAID group,
wherein the RAID group is an SSD (Solid State Drive) RAID group composed of SSDs, and wherein the control circuitry is further constructed and arranged to mark each of the unused regions on each of the SSDs as containing invalid data,
wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group,
wherein each segment of data includes an integer number of RAID strips, and wherein no two segments of data on different disk drives of a RAID group include RAID strips belonging to the same RAID stripe,
wherein, the RAID groups include an instant RAID group, wherein the set of spare disk drives includes an instant spare disk drive, and wherein the control circuitry constructed and arranged to copy the segments of data from the set of regions of the disk drives of the instant RAID group to respective spare regions is further constructed and arranged to copy all segments of data for the instant RAID group to the instant spare disk drive, and wherein the control circuitry is further constructed and arranged to:

for each of the spare regions in the spare disk drive, copy data from that spare region to a respective unused region on another disk drive in the data storage system, the spare regions from which data are copied becoming unused regions in the spare disk drive; and rebuild a set of data into the unused regions of the spare disk drive, the set of data including data previously stored in the failed disk drive.

11. The data storage system of claim 10, wherein the control circuitry is further constructed and arranged to rebuild a set of data into the unused regions in the disk drives of the RAID group, except for the failing disk drive, the set of data including data previously stored in the failed disk drive.

12. A computer program product including a set of non-transitory, computer-readable media having instructions which, when executed by control circuitry of a data storage system, cause the control circuitry to perform a method of managing spare disk drives in a data storage system, the method comprising:

operating a RAID (Redundant Array of Independent Disks) group in the data storage system, the RAID group including multiple disk drives arranged to provide at least one of data mirroring and data parity;

copying segments of data from a set of regions in the disk drives to respective spare regions in a spare disk drive, the set of regions in the disk drives of the RAID group becoming unused regions and the spare regions in the spare disk drive effecting an overprovisioning of storage for the RAID group; and upon a failure of one of the disk drives in the RAID group, rebuilding data of the failed disk drive based on (i) the segments of data and (ii) data from a set of still-functioning disk drives in the RAID group, wherein the RAID group is an SSD (Solid State Drive) RAID group composed of SSDs, and wherein the method further comprises marking each of the unused regions on each of the SSDs as containing invalid data, wherein a number of segments are copied from the set of regions to the set of spare regions for each RAID group, wherein each RAID group includes a number of disk drives, and wherein the number of segments in each RAID group copied from the set of regions to the set of spare regions is an integer multiple of the number of disk drives in the RAID group, wherein each segment of data includes an integer number of RAID strips, and wherein no two segments of data on different disk drives of a RAID group include RAID strips belonging to the same RAID stripe, wherein, the RAID groups include an instant RAID group, wherein the set of spare disk drives includes an instant spare disk drive, and wherein copying the segments of data from the set of regions of the disk drives of the instant RAID group to respective spare regions includes copying all segments of data for the instant RAID group to the instant spare disk drive, and wherein the method further comprises:

for each of the spare regions in the instant spare disk drive, except any spare regions to which any segments of data were copied from the failing disk drive, copying data from that spare region to a respective unused region in the instant RAID group, the spare regions from which data are copied becoming unused regions in the instant spare disk drive; and rebuilding a set of data into the unused regions of the instant spare disk drive, the set of data including data previously stored in the failed disk drive.

13. The computer program product of claim 12, wherein the method further comprises:

for each of the spare regions in the spare disk drive, except any spare regions to which any segments of data were copied from the failing disk drive, copying data from that spare region to a respective unused region in the RAID group, the spare regions from which data are copied becoming unused regions in the spare disk drive; and rebuilding a set of data into the unused regions of the spare disk drive, the set of data including data previously stored in the failed disk drive.

14. The computer program product of claim 13, wherein, after rebuilding the set of data into the unused regions of the spare disk drive, the spare disk drive becomes part of the RAID group, and wherein the method further comprises:

providing a second spare disk drive; and copying segments of data from a set of regions of the disk drives of the RAID group to respective spare regions in the second spare disk drive, the set of regions in the disk drives of the RAID group becoming unused regions and the spare regions in the second spare disk drive effecting an overprovisioning of storage to the RAID group.

15. The computer program product of claim 12, wherein the method further comprises rebuilding a set of data into unused regions in other disk drives in the data storage system, the set of data including data previously stored in the failed disk drive.

* * * * *